United States Patent Office 3,830,865
Patented Aug. 20, 1974

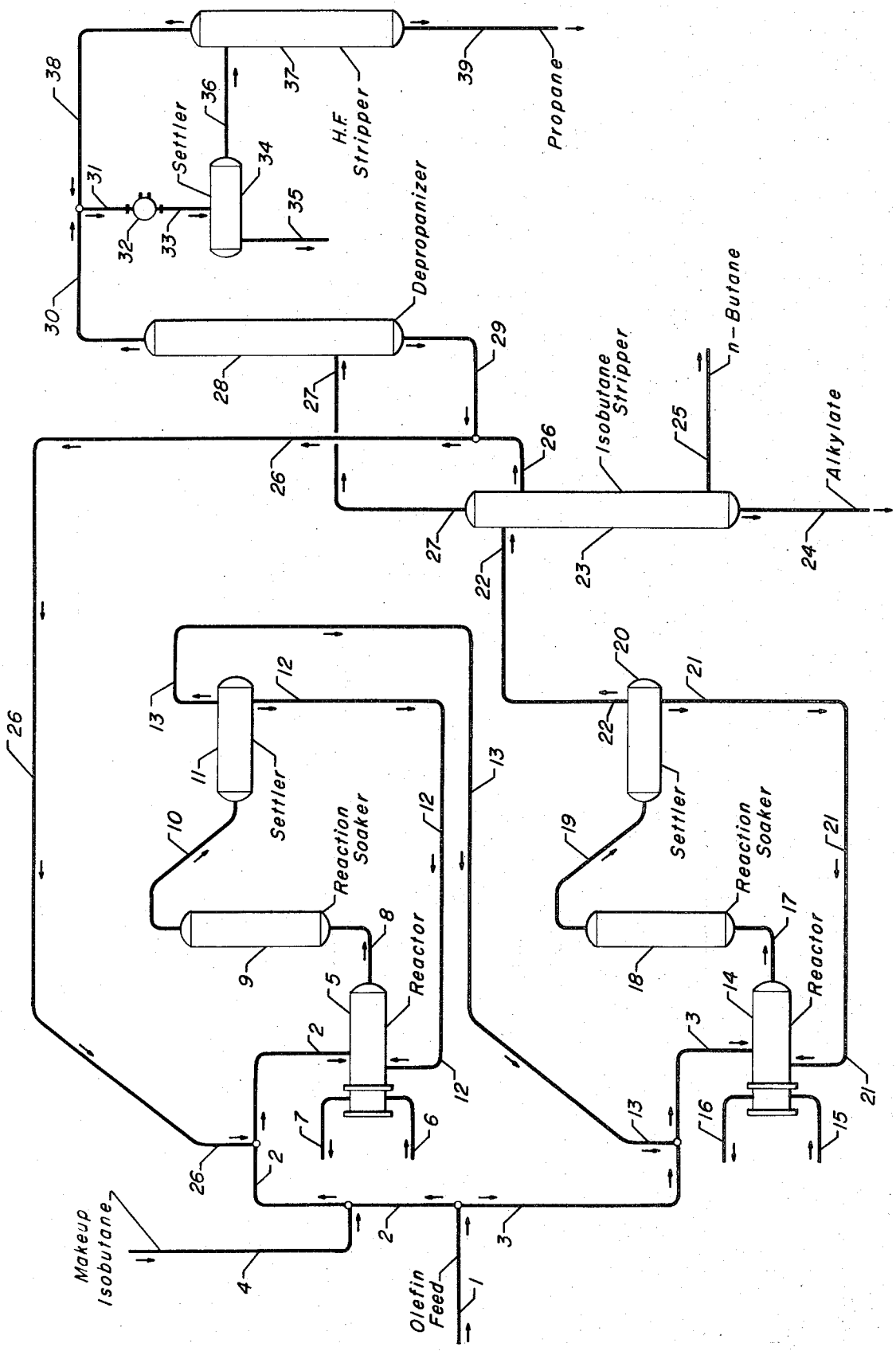

---

3,830,865
ALKYLATION PROCESS USING HYDROGEN FLUORIDE CATALYST
Robert F. Anderson, La Grange Park, Ill., assignor to Universal Oil Products Company, Des Plaines, Ill.
Continuation-in-part of application Ser. No. 236,049, Mar. 20, 1972. This application Sept. 21, 1972, Ser. No. 291,137
Int. Cl. C07c 3/54
U.S. Cl. 260—671 R                  6 Claims

ABSTRACT OF THE DISCLOSURE

A process for alkylating an alkylatable hydrocarbon with an olefin-acting reactant by contacting the alkylatable hydrocarbon with a first portion of the olefin-acting reactant and with a first hydrogen fluoride alkylation catalyst in a first alkylation zone; contacting the hydrocarbon effluent with the first alkylation zone with a second portion of the olefin-acting reactant and with a second hydrogen fluoride alkylation catalyst in a second alkylation zone, and recovering the alkylation reaction product from the hydrocarbon effluent from the second alkylation zone.

CROSS REFERENCE TO RELATED APPLICATIONS

This application is a continuation-in-part of my copending application Ser. No. 236,049, filed on Mar. 20, 1972.

BACKGROUND OF INVENTION

This invention relates to a process for producing an alkylation reaction product from an alkylatable hydrocarbon and an olefin-acting reactant. In one aspect, this invention relates to a process for alkylating an isoparaffin with an olefin-acting reactant, utilizing hydrogen fluoride catalyst, to provide valuable motor fuel components. In another aspect, this invention relates to a process for alkylating an aromatic hydrocarbon with a $C_9$–$C_{15}$ olefin-acting reactant utilizing hydrogen fluoride catalyst, to provide valuable alkylaromatic petrochemical products.

Alkylation of isoparaffinic hydrocarbons, such as isobutane, isopentane and the like, with olefinic hydrocarbons such as propylene, butylene, amylenes, and olefin-acting compounds such as $C_3$–$C_5$ alkyl halides, etc., using hydrogen fluoride as a catalyst, is well known as a commercially important method for producing gasoline boiling range hydrocarbons. The $C_5$–$C_{10}$ hydrocarbons typically produced by the isoparaffin-olefin alkylation reaction are termed "alkylate." Alkylate is particularly useful as a motor fuel blending stock because of its high motor and research octane ratings, such that it can be used to improve the overall octane rating of gasoline pools to comply with the requirements of modern automobile motors. These high octane alkylate fuel components are particularly important in producing motor fuels of sufficient quality when it is desired not to employ alkyl lead compounds in the fuel to meet octane requirements. A continuing goal of the art is to provide a hydrogen fluoride catalyzed alkylation process which provides an alkylate product having higher motor and research octane ratings than is possible using conventional processes, in an economical manner.

In general, commercial isoparaffin-olefin alkylation processes employ isobutane and sometimes isopentane as the isoparaffin and propylene, butylenes, amylenes, or a mixture thereof, as the olefin-acting reactant. The isoparaffin, olefin-acting agent and hydrogen fluoride catalyst are contacted in an alkylation reactor, forming a reaction mixture. After the alkylation reaction is substantially complete, the reaction mixture is withdrawn from the reactor and is settled into hydrocarbon and catalyst phases in a settling vessel, and the hydrogen fluoride catalyst thus separated is recycled to the reactor for further use. The hydrocarbon phase produced by the settling operation is further processed by, for example, fractionation, to recover the alkylate product and to separate unconsumed isoparaffin for further use by recycle to the alkylation reactor.

It has been found necessary to conduct hydrogen fluoride-catalyzed isoparaffin-olefin alkylation processes at specific conditions of temperature and pressure, and at specific concentrations of reactants and catalyst in order to provide an acceptable yield of high quality alkylate product. A large molar excess of isoparaffin over the olefin-acting compound in the reaction mixture, generally about 10:1 to about 30:1, is one of the conditions required to provide an adequate product, although low quality alkylate can be produced using isobutane/olefin mole ratios lower than 10:1. It has been found desirable to employ as large an excess of isoparaffin as economically possible, since the quality of the alkylate product is improved thereby, as exemplified by the increased octane rating of the product. Thus, in conventional operations, a considerable amount of isoparaffin is necessarily recovered and recycled to the alkylation reactor after fractionation to separate it from the alkylate fraction of the hydrocarbon phase produced by settling. The large amounts of isoparaffin which must accordingly be passed, unreacted, through an alkylation reactor and settler and separated from the alkylate product necessitate the use of fractionation equipment of large capacity, with high energy consumption, in order to provide even an adequate separation of the product alkylate from the isoparaffin to be recycled.

Prior art has attempted to alleviate this problem by circulating an emulsion of the hydrogen fluoride catalyst, isoparaffin, and alkylation reaction products, in an attempt to utilize the isoparaffin in this emulsion to provide a portion of the excess isoparaffin needed. Thus, the emulsion was withdrawn from a reactor and charged into the reactor again along with fresh olefinic reactant. Another similar prior art attempt to provide the high isoparaffin excess needed during the alkylation reaction was to pass the reaction mixture of hydrogen fluoride, isoparaffin and reaction products from a first alkylation zone into a second alkylation zone, where it was contacted with fresh olefinic feed and further alkylation occurred. These attempts to provide a high isoparaffin/olefin mole ratio in the alklation zone failed to provide any substantial increase in the quality of the alkylate produced and have generally been abandoned in successful commercial operations. Thus there remains significant expense and difficulty, in commercial operations, in providing the required isoparaffin/olefin mole ratio in the reactor, which necessitates throughput, separation and recycle of excessive amounts of isoparaffin. This problem is substantially alleviated by the present invention.

Processes for the production of $C_9$–$C_{15}$ side chain alkylaromatic hydrocarbons using hydrogen fluoride as a catalyst have assumed significant importance in the petroleum and petrochemical industries for use in providing starting materials in the manufacture of detergents. Examples of commercially important alkylaromatic alkylation processes include alkylation of benzene, toluene, etc., with $C_9$–$C_{15}$ linear olefins or alkyl halides, which produce linear alkylaromatics called detergent alkylate. This alkylate is then further treated to produce bio-degradable detergents.

Although aromatic alkylation processing conditions in hydrogen fluoride catalyzed operations are generally more dependent on equilibrium considerations than are isoparaffin alkylation conditions, it has been found desirable to employ a large molar excess of the alkylatable aromatic hydrocarbon over the olefin-acting reactant at aromatic alkylation conditions in order to provide adequate yields of the desired alkylaromatic product, and also to control the temperature in the alkylation reactor. The necessity for using large excess amounts of the alkylatable aromatic hydrocarbon in the alkylation reaction leads to economic and technical difficulties similar to those encountered in an isoparaffin-olefin alkylation operation. For example, when benzene is alkylated with $C_9$–$C_{15}$ linear olefins, the large amount of unreacted benzene in the alkylation reactor effluent must be separated from the product through the use of large fractionation apparatus, with attendant capital and utilities expense, and the benzene recycled to the alkylation reactor for further use. Failure to employ a molar excess of the alkylatable aromatic in the alkylation reaction step leads to the formation of polyalkylaromatics, polymers of the $C_9$–$C_{15}$ olefin-acting reactant, and other undesirable side products which are wasteful of the reactant and difficult to separate from the desired products. The process of the present invention is directed, in part, to providing a method for reducing the amount of alkylatable aromatic hydrocarbon which must be separated, recovered and recycled after the alkylation reaction, while the general quality and quantity of the alkylaromatic product produced in the aromatic alkylation process is improved.

SUMMARY OF THE INVENTION

It is an object of the present invention to provide a processs for alkylating an alkylatable hydrocarbon with an olefin-acting reactant, utilizing hydrogen fluoride alkylation catalyst.

Another object of the present invention is to provide a process for alkylating an isoparaffin with an olefin-acting reactant which produces a superior alkylation reaction product.

A further object of the present invention is to provide a process for alkylating an alkylatable aromatic hydrocarbon with a $C_9$–$C_{15}$ olefin-acting compound wherein an increased yield of the desired alkylaromatic product is provided.

A further object of the present invention is to provide a process for alkylating an isoparaffin with an olefin-acting reactant wherein a reduced recycle and separation of isoparaffin is utilized to provide a high quality motor fuel alkylate product.

A still further object of the present invention is to provide a process for alkylating an alkylatable aromatic hydrocarbon with a $C_9$–$C_{15}$ olefin-acting reactant wherein a reduced separation and recycle of aromatic hydrocarbon is utilized to provide a desirable yield of alkylaromatic product.

In a broad embodiment, the present invention relates to a process for producing an alkylation reaction product from an alkylatable hydrocarbon and an olefin-acting reactant which comprises: contacting a first portion of the olefin-acting reactant with the alkylatable hydrocarbon and with a first hydrogen fluoride alkylation catalyst in a first alkylation zone at hydrogen fluoride alkylation conditions; removing the resultant hydrocarbons from contact with the first alkylation zone and the first hydrogen fluoride catalyst to form a first hydrocarbon effluent stream; contacting a second portion of the olefin-acting reactant with at least a portion of the first hydrocarbon effluent stream and with a second hydrogen fluoride alkylation catalyst in a second alkylation zone at hydrogen fluoride alkylation conditions; removing the resultant hydrocarbons from contact with the second alkylation zone and the second hydrogen fluoride catalyst to form a second hydrocarbon effluent stream; and recovering the alkylation reaction product from the second hydrocarbon effluent stream.

In one limited embodiment, the present invention relates to a process for producing an isoparaffinic alkylation reaction product from isobutane and a $C_3$–$C_5$ olefin which comprises: contacting a first portion of the $C_3$–$C_5$ olefin with isobutane and with a first hydrogen fluoride alkylation catalyst in a first alkylation zone at hydrogen fluoride alkylation conditions; removing the resultant hydrocarbons from the first alkylation zone and from contact with the first hydrogen fluoride catalyst to form a first hydrocarbon effluent stream; contacting a second portion of the $C_3$–$C_5$ olefin with the first hydrocarbon effluent stream and with a second hydrogen fluoride alkylation catalyst in a second alkylation zone at hydrogen fluoride alkylation conditions; removing the resultant hydrocarbons from the second alkylation zone and from contact with the second hydrogen fluoride catalyst to form a second hydrocarbon effluent stream; and, recovering the isoparaffinic alkylation reaction product from the second hydrocarbon effluent stream.

In another limited embodiment, the present invention relates to a process for producing an alkylaromatic alkylation reaction product from benzene and a $C_9$–$C_{15}$ normal olefin which comprises: contacting a first portion of the $C_9$–$C_{15}$ normal olefin with the benzene and with a first hydrogen fluoride alkylation catalyst in a first alkylation zone at hydrogen fluoride alkylation conditions; removing the resultant hydrocarbons from the first alkylation zone and from contact with the first hydrogen fluoride catalyst to form a first hydrocarbon effluent stream; contacting a second portion of the $C_9$–$C_{15}$ normal olefin with the first hydrocarbon effluent stream and with a second hydrogen fluoride alkylation catalyst in a second alkylation zone at hydrogen fluoride alkylation conditions; removing the resultant hydrocarbons from the second alkylation zone and from contact with the second hydrogen fluoride catalyst to form a second hydrocarbon effluent stream; and, recovering the alkylaromatic alkylation reaction product from the second hydrocarbon effluent stream.

Among the important advantages of the process of this invention over prior art processes are those which derive from a substantial reduction in the overall excess amount of the alkylatable reactant needed in relation to the olefin. By passing only a portion of the olefin-acting reactant to the first alkylation reactor, a significantly smaller amount of the alkylatable reactant is required in the hydrogen fluoride-catalyzed alkylation reaction to provide an adequate molar excess of alkylatable reactant in relation to the amount of olefin-acting reactant utilized. The hydrocarbon effluent from the first reactor and settled is then contacted with a second portion of the olefin-acting compound in a second hydrogen fluoride catalyzed alkylation reaction, whereby the same relatively small amount of alkylatable reactant is utilized to provide the desired molar excess of alkylatable reactant in both the first and the second reactors, at hydrogen fluoride alkylation conditions. The hydrocarbon effluent from the second reactor is then treated, e.g. by conventional fractionation, to separate and recycle the excess alkylatable reactant and to recover the desired alkylation reaction product. The amount of excess alkylatable reactant which must be thus separated and recycled is substantially less than that found in conventional alkylation processes. Alternatively, a conventional amount of recycled alkylatable reactant may be employed, giving a superior reaction product.

I have found that the benefits of providing a high molar excess of isoparffin in an alkylation reactor cannot be achieved when the isoparaffin is used in the form of an emulsion or mixture with the hydrogen fluoride catalyst. Instead, it is necessary to first separate the isoparaffin from the catalyst. When the isoparaffin is used as an emulsion, there is little or no benefit in respect to alkylate quality. By using the method of the present invention, whereby the isoparaffin is first separated from the first hydrogen fluoride catalyst and then subsequently utilized in the second alkylation zone with a different hydrogen fluoride catalyst, this isoparaffin acts, substantially, like a fresh isoparaffin feed. Conversely, the prior art method in which the isoparaffin is employed in admixture with hydrogen fluoride catalyst in one or more alkylation zones, does not provide isoparaffin which acts like a fresh isoparaffin feed, and a low quality alkylate product results.

Further objects, embodiments and advantages of the present process will be apparent to those skilled in the art from the following description of the drawing and detained description of the invention.

DESCRIPTION OF THE DRAWING

The attached drawing is a schematic illustration of a preferred embodiment of the process of the present invention. In the particular embodiment set forth, the alkylatable hydrocarbon is isobutane and the olefin-acting reactant is a mixture of propylene and butylenes. The scope of the present invention is not intended to be limited to the embodiment shown, and various other suitable reactants and embodiments will be obvious to those skilled in the art from the description hereinafter provided.

Referring to the drawing, a conventional olefin feed to a hydrogen fluoride catalyzed isoparaffin-olefin alkylation process is charged continuously through conduit 1. The olefins are chaged at a rate of about 300 moles/hour propylene and 300 moles per hour butylenes. In addition, smaller amounts of other hydrocarbons which are conventionally present in a commercial olefin feedstock, but not necessary for operation of the process, including 120 moles/hour isobutane, 35 moles/hour n-butane and 70 moles/hour propane, are charged through conduit 1 in admixture with the olefins. The continuously charged hydrocarbons in conduit 1 are divided into two streams of equal volume and passed into conduits 2 and 3. The olefinic feedstocks passed into conduits 2 and 3 thus both comprise 150 moles/hour propylene, 150 moles/hour butylenes, 60 moles/hour isobutane, 17.5 moles/hour n-butane and 35 moles/hour propane. Make-up isobutane is charged via conduit 4 into conduit 2 and admixed in conduit 2 with the portion of the olefin feedstock therein. The make-up isobutane stream is passed through conduit 4 at a rate of 500 moles/hour of isobutane, with conventional amounts of non-reactive contaminants including about 15 moles/hour n-butane and about 10 moles/hour propane. The admixed make-up isobutane and olefin feed continues through conduit 2, and recycled isobutane from conduit 26 is passed into conduit 2 and admixed with the contents thereof. The recycle isobutane is passed into conduit 2 at the rate of 3550 moles/hour isobutane, with some other non-reactive hydrocarbon recycle, resulting from imprecise fractionation, including 525 moles/hour n-butane and 225 moles/hour propane. The total hydrocarbon charge to reactor 5 thus includes 150 moles/hour propylene, 150 moles/hour butylenes, 4110 moles/hour isobutane, with non-reactive hydrocarbons including 270 moles/hour propane and 557.5 moles/hour n-butane. The isobutane/olefin mole ratio of the feed to reactor 5 is thus 13.7. The combined feed is passed through conduit 2 into reactor 5 and admixed with hydrogen fluoride alkylation catalyst to form a reaction mixture. The hydrogen fluoride alkylation catalyst is charged to reactor 5 through conduit 12. The catalyst contains about 80 wt. percent acid, less than about 1 wt. percent water, with the remainder being conventional organic diluent. Alkylation conditions maintained in reactor 5 include a temperature of about 90–100° F. and a pressure sufficient to maintain the reactants and catalyst in the liquid phase. An acid/hydrocarbon volume ratio of about 1 to about 2 is also maintained. Heat generated in the alkylation reaction is withdrawn through the use of indirect heat exchange. Cooling water is charged through conduit 6 into reactor 5, and passed in indirect heat exchange with the reaction mixture. Used cooling water is withdrawn via conduit 7. After a contact time of about 0.1 minute to about 5 minutes, the reaction mixture in reactor 5 is withdrawn and passed through conduit 8 into reaction soaker 9. The reaction mixture of catalyst, reactants and reaction products is maintained in reaction soaker 9 for about 1 minute to about 10 minutes at a temperature and pressure about the same as employed in reactor 5. The reaction mixture is then withdrawn and passed through conduit 10 into settler 11. The reaction mixture is allowed to stand without agitation in settler 11, whereby the hydrogen fluoride catalyst forms a heavier phase and the hydrocarbon components of the reaction mixture form a lighter phase. The lower, catalyst phase is withdrawn from the bottom of settler 11 through conduit 12 and passed back to reactor 5 for further catalytic use. It may be necessary to treat a portion of the recycle catalyst to maintain the desired acid strength, etc. This can be done by passing a slip stream of catalyst from conduit 12 to conventional regeneration means. Such a regeneration operation being conventional not essential to an understanding of the present invention, the mode of performance thereof will be obvious to those skilled in the art, and the operation is not included in the drawing and description thereof. Referring again to settler 11, the hydrocarbon phase formed therein, which includes the total hydrocarbon effluent from reactor 5 and reaction soaker 9, is withdrawn from the top of settler 11 via conduit 13, and passed into conduit 3 wherein the total hydrocarbon effluent from the first alkylation zone (which includes reactor 5, reaction soaker 9 and settler 11) is commingled with the portion of olefin feed in conduit 3. The hydrocarbon effluent passed through conduit 13 includes approximately 3800 moles/hour isobutane, substantially no olefins, 557.5 moles/hour n-butane, 280 moles/hour propane and 300 moles/hour of alkylate. The combined hydrocarbon charge to reactor 14 from conduit 3 includes about 3860 moles/hour isobutane, 150 moles/hour propylene, 150 moles/hour butylenes, 575 moles/hour n-butane, 315 moles/hour propane and 300 moles/hour alkylate. The isobutane/olefin mole ratio of the hydrocarbon charge to reactor 14 is thus about 13. The reaction conditions employed in reactor 14 are similar to those employed in reactor 5, i.e., a temperature of about 90–100° F., acid/hydrocarbon volume ratio of about 1 to about 2 and a pressure sufficient to maintain the reaction mixture components in the liquid phase. Hydrogen fluoride catalyst containing about 80 wt. percent acid, less than about 1 wt. percent water, with the remainder made up of organic diluent, is charged to reactor 14 through conduit 21 and intimately admixed with the hydrocarbon feed from conduit 3 to form the reaction mixture. Cooling water is charged through conduit 15 and passed in indirect heat exchange with the reaction mixture in reactor 14. Used cooling water is withdrawn through conduit 16. After a contact time of about 0.1 minute to about 5 minutes, the reaction mixture is withdrawn from reactor 14 and passed through conduit 17 into reaction soaker 18. The reaction mixture of catalyst, reactants and reaction products is maintained in reaction soaker 18 for a contact time of about 1 minute to about 10 minutes at a temperature and pressure substantially the same as employed in reactor 14. The reaction mixture is then withdrawn and passed through conduit 19 into settler 20. The reaction mixture is allowed to stand without agitation in settler 20 to facilitate separation of the catalyst and hydrocarbons into separate phases. The heavier, catalyst phase is withdrawn from the bottom of settler 20 through conduit 21 and recycled to reactor 14 for further catalytic use as described. A portion of the catalyst in conduit 21 may be passed to a conventional regeneration operation if desired. The upper, hydrocarbon phase in settler 20 is withdrawn through conduit 22 and continuously passed into isobutane stripper 23. The hydrocarbon effluent from settler 20 is passed through conduit 22 at the rate of about 325 moles/hour propane, 3550 moles/hour isobutane, 575 moles/hour n-butane and 600 moles/hour alkylate ($C_5^+$ hydrocarbons). In isobutane stripper 23, the hydrocarbon effluent from settler 20 is fractionated to separate a recycle isobutane stream and a product alkylate stream. The vessel employed as the isobutane stripper contains conventional trays, reboiling means, refluxing means, etc., all known in the art. Alkylate product is removed as a bottoms product from isobutane stripper 23 through conduit 24, passed out of the operation, and recovered for motor fuel or other desired uses at the rate of 600 moles/hour. Normal butane, by-product of the process in the embodiment shown, is withdrawn as a side cut through conduit 25 at the rate of 50 moles/hour. Recycle isobutane is withdrawn as a side cut on a higher tray in isobutane stripper 23 through conduit 26. The recycle isobutane stream is passed out of isobutane stripper 23 through conduit 26 at the rate of 3320 moles/hour isobutane, 500 moles/hour n-butane and 225 moles/hour propane. The recycle isobutane stream in conduit 26 is passed into conduit 2 as described above. An overhead stream is withdrawn from isobutane stripper 23 and passed through conduit 27 into depropanizer 28. The overhead stream is passed from the isostripper at the rate of 100 moles/hour propane, 230 moles/hour isobutane and 25 moles/hour n-butane. In depropanizer 28, the feed from conduit 27 is fractionated to separate propane from isobutane and n-butane. The isobutane and n-butane are withdrawn, at the rate of 230 moles/hour isobutane and 25 moles/hour n-butane, as a bottoms product and passed through conduit 29 into conduit 26 for use in the recycle isobutane stream. Propane, admixed with some hydrogen fluoride, is withdrawn overhead through conduit 30, at the rate of 100 moles/hour propylene, and passed through conduit 30 into conduit 31 in admixture with hydrogen fluoride from conduit 38. The mixture of propane and hydrogen fluoride in conduit 31 is passed into condenser 32 and condensed to liquefy the propane and acid. The liquefied propane and hydrogen fluoride are then passed through conduit 33 into settler 34. Most of the hydrogen fluoride passed into settler 34 settles out as a heavy phase of relatively pure acid and is withdrawn through conduit 35. This relatively concentrated acid may be passed back into the recycle catalyst streams in conduit 12 and conduit 21, by conventional means not shown. The liquefied propane phase in settler 34 is withdrawn and passed through conduit 36 into hydrogen fluoride stripper 37, wherein the propane is fractionated to separate out any remaining acid. The acid is withdrawn overhead through conduit 38, passed back into conduit 31, and treated as described above. The propane is withdrawn as a by-product from the bottom of hydrogen fluoride stripper 37 through conduit 39 at the rate of 100 moles/hour. Certain conventional equipment and operations necessary for the operation of the embodiment described in the foregoing have been omitted from the dawing and description thereof, e.g. pumps, valves, reboilers, etc. The use and placement of such conventional items will be obvious to those skilled in the art. The foregoing description illustrates some of the advantages of the present invention when embodied in a hydrogen fluoride-catalyzed isoparaffin-olefin alkylation process. For example, reaction conditions in reactor 5 and reactor 14 include a desirable high isobutane/olefin mole ratio of about 13:1, necessary in order to produce alkylate of sufficient quality. Yet fractionation requirements in isobutane stripper 23 need only be sufficient to separate isobutane equivalent to an overall isobutane/olefin mole ratio of less than 7:1. The alkylate produced is of a quality equal or superior to alkylate produced in conventional alkylation processes, while the fractionation requirements are substantially reduced, with the attendant savings in capital and utilities costs. By contrast, alkylate produced in a conventional hydrogen fluoride catalyzed alkylation process using an overall isobutane/olefin mole ratio of 7:1 would be low in quality and lack utility as a blending stock to upgrade low gasoline pool components to the desired octane level.

DETAILED DESCRIPTION OF INVENTION

The hydrogen fluoride catalyzed alkylation process of the present invention may be applied to the alkylation of isoparaffins, alkylatable aromatics or other suitable alkylatable hydrocarbons such as naphthenes, etc. In a preferred embodiment wherein an isoparaffin is employed as the alkylatable hydrocarbon, the preferred isoparaffins are isobutane and isopentane, particularly isobutane. A mixture of two or more isoparaffins may also be employed, if desired. A suitable isoparaffin feedstock for use in the present process may contain some non-reactive contaminants such as normal paraffins. For example, a conventional commercial isobutane alkylation feedstock generally contains about 95 wt. percent isobutane, 4 wt. percent n-butane and 1 wt. percent propane.

Olefin-acting reactants suitable for use in the process of the present invention, in a preferred embodiment wherein the alkylatable hydrocarbon is an isoparaffin, include $C_2$–$C_6$ olefins and alkyl fluorides. $C_3$–$C_5$ olefins and alkyl fluorides are preferred, particularly propylene, butylenes and amylenes. It is to be understood that mixtures of two or more olefin-acting compounds may be employed in the present process with good results. For example many conventional olefin feedstocks in commercial isoparaffin-olefin alkylation operations contain mixtures of propylene and butylenes, butylenes and amylenes, or propylene, butylene and amylenes. The benefits of the present process can be obtained using such feedstocks as well as when using single olefin-acting compounds. Similarly, a mixture of $C_3$–$C_5$ alkyl fluorides and olefins in any proportion is also suitable. The particularly preferred $C_3$–$C_5$ olefin feedstocks may be derived from petroleum refining processes such as catalytic cracking and may contain substantial amounts of saturates, lighter and heavier olefins, etc.

The hydrogen fluoride catalyst employed in the present process, in embodiments wherein the alkylatable hydrocarbon is isobutane, is well known in the art. Generally, this hydrogen fluoride alkylation catalyst contains about 75 wt. percent or more of titratable acid, about 5 wt. percent or less water, with the remainder being organic diluent. Such an alkylation catalyst is suitable for use in both the first and second alkylation reactors in the present process. A particularly preferred catalyst contains about 80 wt. percent acid, less than 1 wt. percent water, the remainder being organic diluent.

Numerous alkylation reaction zones suitable for use in the process of this invention are known in the art. For example, but not by way of limitation, the alkylation reactor described in U.S. Pats. 3,456,033, 3,469,949 and 3,501,536 may suitably be employed for both alkylation reactions when alkylating an isoparaffin with an olefin using the hydrogen fluoride catalyst. Alkylation conditions associated with the particular alkylation reactors described in the above-listed patents or in connection with other suitable conventional alkylation reactors may be used in conjunction with the description herein in embodiments of the present invention. Particular alkylation zones and optimum alkylation conditions in specific embodiments of the present process depend upon the composition of the particular olefin-acting reactant, the particular alkylatable hydrocarbon, and the strength of the hydrogen fluoride catalysts.

Hydrogen fluoride alkylation conditions suitable for use in an embodiment of the present process in which the alkylatable hydrocarbon is an isoparaffin include a temperature of about 0° F. to about 200° F., a pressure sufficient to maintain the reactants and the hydrogen fluoride catalyst in the liquid phase, and a contact time between the hydrocarbons and catalyst of about 0.1 minute to about 30 minutes. In a preferred embodiment utilizing a hydrogen fluoride alkylation catalyst containing about 75–85 wt. percent acid, a catalyst/hydrocarbon volume ratio of about 0.1 to about 10 is preferred, and a temperature of about 50° F. to about 150° F. is preferably employed in the reactor.

In a particularly preferred embodiment, the reaction mixture of hydrogen fluoride catalyst, reactants and reaction products formed in the alkylation reactor is passed through a reaction soaker. In the description of the preferred embodiments herein provided, it is intended that both the alkylation reactor and a reaction soaker, if one is utilized, are included within the scope of the term "alkylation zone." Suitable reaction soakers are well known in the art. For example, the reaction soakers described in U.S. Pats. 3,560,587 and 3,607,970 may suitably be employed in the present process. Such reaction soakers are commonly vessels equipped with perforated trays, baffle sections, or the like, to maintain the mixture of catalyst and hydrocarbons charged from the alkylation reactor as a fairly homogeneous mixture, or emulsion, for a predetermined length of time. The mixture of catalyst and hydrocarbons is maintained in the reaction soaker for a time which depends on the composition of the reaction mixture. A reaction soaker residence time of about 1 minute to about 30 minutes is preferred. The temperature and pressure maintained in the reaction soaker are the same as the temperature and pressure maintained in the alkylation reactor.

Means for separating a hydrocarbon phase and a hydrogen fluoride catalyst phase out of the reaction mixture effluent from an alkylation reactor or reaction soaker, to provide the hydrocarbon effluent from the alkylation zone, are well known in the alkylation art. Generally, the effluent from an alkylation reactor or soaker comprises a mixture of isoparaffin, reaction products, hydrogen fluoride catalyst and catalyst-soluble organic materials, possibly with small amounts of light hydrocarbon gases, etc. When this mixture is allowed to stand unstirred, i.e., settled, the reaction products, isoparaffin and light hydrocarbon gases form a hydrocarbon phase containing a small amount of catalyst in solution. The catalyst and catalyst-soluble hydrocarbons form a separate phase. The hydrocarbon phase is then easily mechanically separated from the catalyst phase. The term "hydrocarbon effluent stream" is intended to include this hydrocarbon phase, when removed from a settler. The temperature and pressure maintained during such a settling operation in a hydrogen fluoride catalyzed alkylation process are substantially the same as those described above in connection with hydrogen fluoride alkylation conditions employed in a reactor. The hydrocarbons and the catalyst are preferably maintained in the liquid phase during the separation operation.

Some means for withdrawing heat from the alkylation zone is necessary for operation of the process. A variety of means for accomplishing the heat withdrawal are well known. For example, in one embodiment the heat generrated in the alkylation reaction may be withdrawn directly from the alkylation reactor by indirect heat exchange between cooling water and the reaction mixture in the reactor.

The hydrocarbon effluent stream, recovered from the first alkylation zone by settling the reaction mixture to separate the hydrocarbon effluent from the hydrogen fluoride catalyst, is preferably combined with a second portion of the olefin-acting reactant and then charged to the second alkylation reactor, wherein this combined hydrocarbons stream is contacted with a second hydrogen fluoride alkylation catalyst. It is contemplated that sufficient isoparaffin is charged to the first reactor so that no further isoparaffin need be added to the hydrocarbons charged to the second reactor. Generally, the total isoparaffin charge to the alkylation process through, in turn, the first alkylation zone and then the second alkylation zone. Under some conditions, it may be advantageous to charge some further fresh isoparaffin to the second alkylation reactor, and such a modification is within the scope of this invention. The hydrocarbons recovered from the second reaction and separation procedure may be passed to conventional fraction operations and equipment, such as an isobutane stripper, whereby the alkylate product is separated from unconsumed isoparaffin and any hydrogen fluoride which may be present in the hydrocarbon effluent from the second alkylation zone. Any suitable method utilized in the prior art to fractionate the hydrocarbon effluent from a settler may be employed to separate the alkylate product from the isoparaffin and possibly hydrogen fluoride.

The alkylation reaction product produced in the preferred embodiment of the present process, when an isoparaffin is employed as the alkylatable reactant, will generally comprise $C_7$ and heavier saturated hydrocarbons resulting from the alkylation reactions of the isoparaffin with the olefin-acting reactant in both the first and second alkylation zones. The primary products include, for example, dimethylpentanes and trimethylpentanes. It is well known that more highly branched hydrocarbons possess superior properties as motor fuel, and the present invention is directed, in part, to providing motor fuel alkylate containing a higher ratio of more highly branched hydrocarbons, such as trimethylpentanes, to less branched hydrocarbons, such as dimethylhexanes. This benefit is obtained by the use in the present process of high isoparaffin/ olefin mole ratios, unattainable in prior art process on any economical or operative basis. Thus, it is apparent that the present invention provides a novel process for producing a superior motor fuel alkylate product by a method more economical and convenient than has been available in prior art hydrogen fluoride-catalyzed alkylation processes.

When the alkylatable hydrocarbon employed in the process of the present invention is an alkylatable aromatic, the preferred alkylatable hydrocarbons are monocyclic aromatics such as benzene, toluene, xylenes, ethylbenzene, cumene, trimethylbenzenes, di- and triethylbenzene, etc., particularly benzene. The present process is applicable to a wide range of alkylatable aromatics but will be described in terms of a mono-cyclic aromatic such as benzene for the sake of brevity. Those skilled in the art will recognize the broader aspects of the present invention from the description provided.

The olefin-acting reactants which may suitably be employed in embodiments of the present process wherein the alkylatable hydrocarbon is an aromatic include nonenes, decenes, undecenes, dodecenes, tridecenes, tetradecenes, pentadecenes, and mixtures thereof. $C_9-C_{15}$ alkyl halides may also be utilized with good results. Particularly preferred are the $C_9-C_{15}$ normal mono-olefins and normal alkyl fluorides. These suitable olefin-acting reactants may be utilized when admixed with some nonreactive contaminants such as $C_9-C_{16}$ paraffins, etc.

The catalyst employed in the process of the present invention to alkylate an alkylatable aromatic with a suitable olefin-acting reactant is hydrogen fluoride containing about 90 wt. percent or more of titratable acid. Hydrogen fluoride alkylation conditions employed in this embodiment include a temperature of about 0° F. to about 200° F. and sufficient pressure to maintain the reactants in the liquid phase. In general, the conditions and procedure are very similar to those employed in using the hydrogen fluoride catalyst as described in the embodiment wherein an isoparaffin was the alkylatable hydrocarbon. The hydrogen fluoride catalyst, benzene and a first portion of a $C_9-C_{15}$ olefin are contacted in the first alkylation reactor to form a reaction mixture. The mixture is then settled to separate the hydrocarbons from the catalyst, and the catalyst is recycled to the reactor for further use. The hydrocarbon effluent from the first alkylation zone is then passed to the second alkylation reactor and contacted with a second portion of the $C_9-C_{15}$ n-olefin and a second hydrogen fluoride catalyst to form a second reaction mixture. The second reaction mixture is settled and the catalyst is recycled to the second reactor. The hydrocarbon effluent from the second alkylation zone is then fractionated to separate and recover the linear alkylbenzene product and the unreacted benzene. The product is removed, and the benzene is recycled to the first alkylation zone for further use. A benzene/olefin mole raito of about 10:1 or more is preferred in such an operation to provide an adequate yield of the product and prevent formation of olefin polymers and polyalkylbenzene.

In general, the benefits and advantages of the present process are provided when the alkylatable hydrocarbon is contacted with at least two different portions of the olefin-acting reactant and two different hydrogen fluoride catalysts in at least two different alkylation zones. One obvious modification of the present process is to divide the olefin-acting reactant into a plurality of portions, e.g. three or more. The alkylatable reactant and a first portion of the olefin-acting reactant are contacted with hydrogen fluoride in a first alkylation zone, the catalyst and hydrocarbons are separated, and the hydrocarbon effluent from the first alkylation zone and a second portion of the olefin-acting reactant are contacted with hydrogen fluoride in a second alkylation zone, and the catalyst-free hydrocarbon effluent from the second alkylation zone and a third portion of the olefin-acting reactant are contacted with hydrogen fluoride in a third alkylation zone, etc. The catalyst-free hydrocarbon effluent from the last alkylation zone in the series is fractionated to recover the alkylation reaction product and separate the remaining alkylatable reactant for recycle to the first alkylation zone. Such a scheme is within the scope of the present invention.

Where it is desired to employ two alkylation zones and to divide the olefin-acting reactant into two portions, as in the preferred embodiment described, it is preferred that the portions be such that neither portion contains less than about 10 volume percent of the total amount of olefin-acting reactant used in the process. For example, in a continuous operation, the first portion of olefin-acting reactant may be fed to the first alkylation zone at a rate of 10 moles/hour along with an amount of alkylatable hydrocarbon sufficient to provide the desired molar excess thereof in the first reactor at hydrogen fluoride alkylation conditions. The second portion of olefin-acting reactant is, in this case, preferably fed into the second alkylation zone at a rate of at least about 1 mole/hour and not more than about 100 moles/hour. Preferably the two portions of olefin-acting compound do not vary in the amount of olefin-acting compound they contain by more than about 1:5 to about 5:1, by volume. Best results are achieved in a two-reactor system, as described in the preferred embodiments, when the two portions of olefin-acting reactant contain roughly equal amounts of the olefin-acting reactant. In this way, the amount of alkylatable hydrocarbon needed to provide an optimum molar excess in each alkylation zone at hydrogen fluoride alkylation conditions is kept to a minimum, while the highest quality product possible can thereby be obtained from both the first and second reactors.

I claim as my invention:

1. A process for producing an alkylation reaction product from an alkylatable aromatic hydrocarbon and an olefin-acting reactant which comprises the steps of:
   (a) contacting a first portion of said olefin-acting reactant with said aromatic hydrocarbon and with a first hydrogen fluoride alkylation catalyst in a first alkylation zone at hydrogen fluoride alkylation conditions;
   (b) removing the resultant mixture of hydrocarbons and catalyst from said first alkylation zone, separating the hydrocarbons from said first hydrogen fluoride catalyst to form a first hydrocarbon effluent stream and recycling thus separated catalyst to said first zone;
   (c) contacting a second portion of said olefin-acting reactant with at least a portion of said first hydrocarbon effluent stream and with a second hydrogen fluoride alkylation catalyst in a second alkylation zone at hydrogen fluoride alkylation conditions;
   (d) removing the resultant hydrocarbons and catalyst from said second alkylation zone and separating the hydrocarbons from said second hydrogen fluoride catalyst to form a second hydrocarbon effluent stream, recycling thus separated second catalyst to said second zone, and recovering said alkylation reaction product from said second hydrocarbon effluent stream.

2. The process of Claim 1 wherein said first portion of said olefin-acting reactant comprises about 10 vol. percent to about 1,000 vol. percent of said second portion of said olefin-acting reactant.

3. The process of Claim 1 wherein said alkylatable aromatic hydrocarbon is a monocyclic aromatic selected from benzene, toluene, ethylbenzene and cumene.

4. The process of Claim 1 wherein at least a portion of said second hydrocarbon effluent stream is fractionated to form said alkylation reaction product and an aromatic hydrocarbon recycle stream and at least a portion of said recycle stream is introduced into said first alkylation zone.

5. The process of Claim 3 wherein said olefin-acting compound is selected from nonenes, decenes, undecenes, dodecenes, tridecenes, tetradecenes and pentadecenes.

6. The process of Claim 3 wherein said olefin-acting compound is a $C_9$–$C_{15}$ alkyl halide.

References Cited

UNITED STATES PATENTS

| | | | |
|---|---|---|---|
| 3,007,983 | 11/1961 | Clauson | 260—683.46 |
| 3,236,912 | 2/1966 | Phillips | 260—683.49 |
| 2,818,452 | 12/1957 | Mavity | 260—671 P |
| 3,207,800 | 9/1965 | Williamson et al. | 260—671 B |
| 2,395,775 | 2/1946 | Anderson | 260—671 P |
| 3,422,161 | 1/1969 | Lavigne et al. | 260—671 B |
| 3,433,846 | 3/1969 | Adams et al. | 260—671 B |
| 3,483,265 | 12/1969 | Rakestraw et al. | 260—671 B |
| 3,494,971 | 2/1970 | Fenske | 260—671 B |

CURTIS R. DAVIS, Primary Examiner

U.S. Cl. X.R.

260—671 B, 671 P